United States Patent [19]

Johnson et al.

[11] Patent Number: 5,669,743

[45] Date of Patent: Sep. 23, 1997

[54] FLUID DISPENSING AND CONTROL SYSTEM FOR TAPPING ATTACHMENTS

[75] Inventors: Mark F. Johnson, Harrison, Id.; Wallace G. Boelkins, Grand Rapids, Mich.

[73] Assignees: Tapmatic Corporation, Post Falls, Id.; Unimist, Inc., Grand Rapids, Mich.

[21] Appl. No.: 502,705

[22] Filed: Jul. 14, 1995

[51] Int. Cl.⁶ .................................................. B23B 51/06
[52] U.S. Cl. ........................... 408/56; 409/135; 409/136; 408/61
[58] Field of Search ........................... 408/61, 56, 60, 408/8; 409/136, 135

[56] References Cited

U.S. PATENT DOCUMENTS

| | | | |
|---|---|---|---|
| 3,577,808 | 5/1971 | Visser | 408/61 |
| 3,605,551 | 9/1971 | Steward | 409/136 X |
| 3,999,642 | 12/1976 | Johnson | 192/21 |
| 4,014,421 | 3/1977 | Johnson | 192/48.91 |
| 4,566,829 | 1/1986 | Johnson | 408/239 R |
| 4,708,539 | 11/1987 | Threadgill | 408/61 |
| 5,297,657 | 3/1994 | McConkey | 408/61 X |

FOREIGN PATENT DOCUMENTS

| | | | |
|---|---|---|---|
| 000535271 | 4/1993 | European Pat. Off. | 409/135 |
| WO094021424 | 9/1994 | WIPO | 409/135 |

*Primary Examiner*—Daniel W. Howell
*Assistant Examiner*—Henry W. H. Tsai
*Attorney, Agent, or Firm*—Evanns & Walsh

[57] ABSTRACT

Fluid dispensing and control system for tapping attachments includes a controller mountable upon a machining center and connectable between the tapping attachment and a source of cutting fluid, as well as to the machine's recirculating coolant flow. Connection of the tapping attachment to the machine through the controller determines whether cutting fluid or coolant will circulate to the tapping attachment.

13 Claims, 1 Drawing Sheet

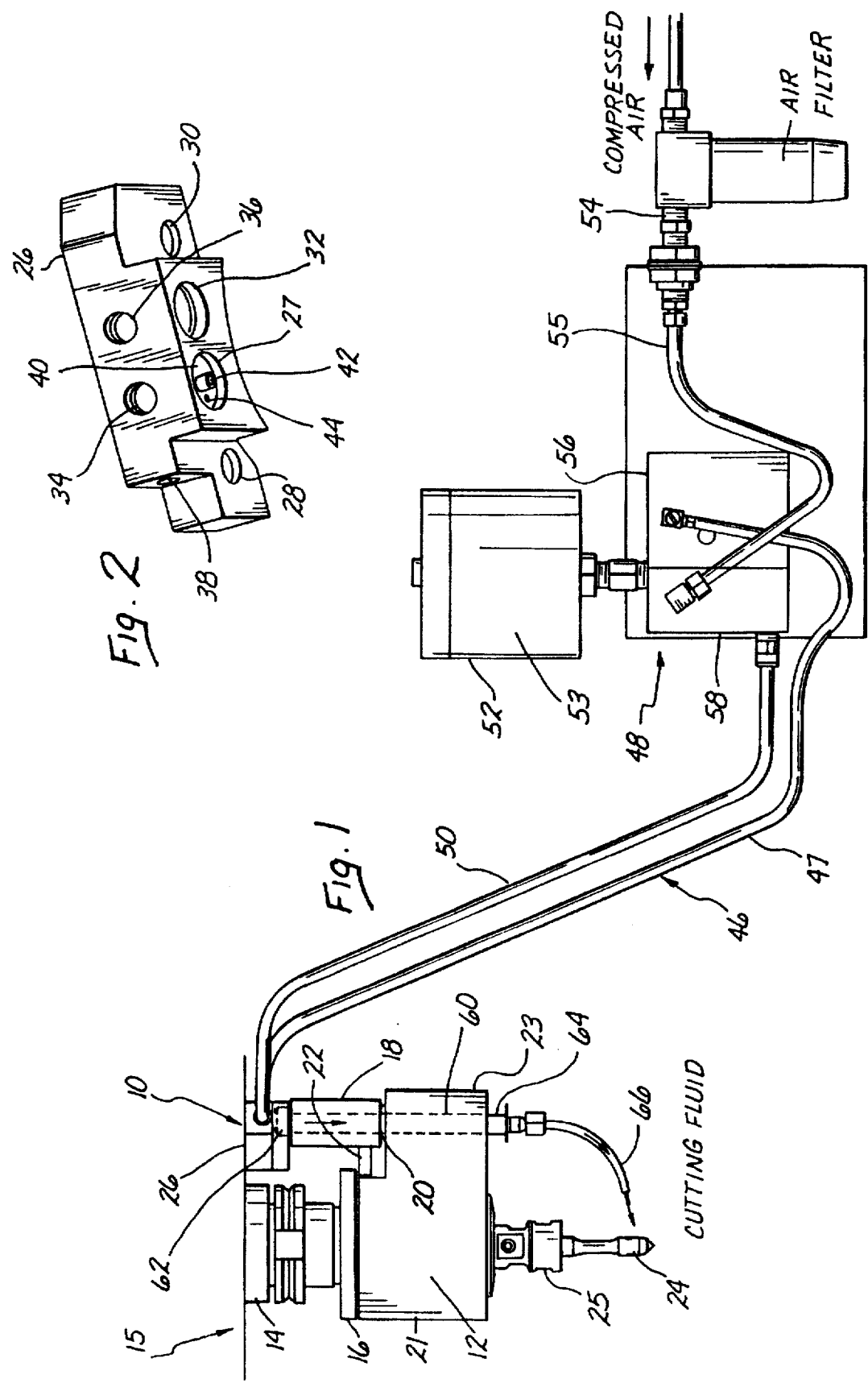

FLUID DISPENSING AND CONTROL SYSTEM FOR TAPPING ATTACHMENTS

BACKGROUND OF THE INVENTION

1. Field of the Invention

The invention pertains to tapping attachments and accessories therefor.

2. History of the Prior Art

The background of the art pertaining to the present invention includes patents issued to Tapmatic Corporation, a co-assignee of the instant patent application: U.S. Pat. Nos. 3,999,642; 4,014,421; and 4,566,829, all of which are incorporated by reference herein as though set out fully. These background patents disclose basic tapping attachments and their structures. Historically, tapping conducted with manually operated machines was performed in connection with good quality cutting fluids. Such cutting fluids provide lubrication for facilitating tapping and enhancing the life of the tap. A number of such fluids have been developed including varieties suitable for tapping of light materials such as aluminum while other specialty fluids are suitable for use with such hard-to-machine items as stainless materials. Other varieties of cutting fluids were developed for general purposes.

All varieties of cutting fluids comprise substantially 100% chemicals as opposed to coolants, which comprise 5%–10% dilute hydrous solutions.

The advent of automated equipment such as Computer Numeric Control (CNC) machining centers brought pressure to compromise the use of cutting fluid. The automated machines were factory-equipped with recirculating coolant systems programmable under machine control. Thus, there was a function (referred to as the M function) to control the flow of coolant under the operator's control. There was, however, no provision for supplying cutting fluid. This led to an unsatisfactory situation in which the operator had to choose between performing tapping with automated equipment and using the available coolant in place of cutting fluid, with accompanying decrease of tap life, and tapping with cutting fluid employing manual equipment with loss of production efficiency. Thus, there has been a felt but unfulfilled need for a system to provide cutting fluid for automated tapping.

SUMMARY OF THE INVENTION

A control for controlling dispensing of cutting fluid for tapping attachments comprises means connectable with a tapping attachment and with a source of cutting fluid, the connection to the tapping attachment being determined by the operator and determining whether cutting fluid or coolant fluid is directed to the tap. A system for controlling dispensing of cutting fluid for tapping attachments comprises the above-mentioned control means including sensor-actuator means at the source of cutting fluid to produce flow of cutting fluid and to deactuate the sensor-actuator to stop the flow of cutting fluid, upon suitable connection of the tapping attachment to the control.

BRIEF DESCRIPTION OF THE DRAWINGS

FIG. 1 is a side elevation, partially schematic and simplified, of a system in accordance with the invention for controlling dispensing of cutting fluid; and FIG. 2 is a detail perspective view of a fluid dispensing control in accordance with the invention.

DETAILED DESCRIPTION OF THE INVENTION AND OF A PREFERRED EMBODIMENT

As depicted in FIGS. 1 and 2, a system 10 for controlling dispensing of fluid for tapping attachments is shown in connection with a tapping attachment 12 attached in a machine spindle 14, on a machine 15 (shown fragmentarily only). The tapping attachment 12 is of the self-reversing type described and claimed in the above-referred U.S. Pat. No. 3,999,642 and will not be described further except as necessary to describe the present invention.

Tapping attachment 12 includes a collar 16, a stop 18, including an axial member 20 and a radial member 22, associated with a housing 21. As described in detail in above-referred U.S. Pat. No. 4,566,829 collar 16 and stop arm 18 comprise a mechanism to secure (by means of engagement of radial member 22 with collar 16) the tapping attachment 10 in a desired position during non-use, and to release the tapping attachment (by disengagement of radial member 22 from collar 16) for operation during use. Stop arm 18 and collar 16 are shown as disengaged, whereby the tapping attachment is ready for performing tapping powered by machine spindle 14. Also as described in detail in U.S. Pat. No. 4,566,829, stop arm 18 is movable axially to disengage radial arm 22 from collar 16 upon engagement with machine spindle 14.

As depicted, tapping attachment 12 is in the engaged position ready for performing tapping on a workpiece (not shown) with a tap 24 in a holder 25. A substantially hollow control member 26 in accordance with the invention is secured to machine 15. In the depicted operating position, axial arm 20 is secured in a first port 27 in member 26. The latter is mounted to machine 15 through mounting holes 28, 30.

As noted above, control member 27 defines a first port 27. In addition, control 26 defines a second port 32. A third port 34 adjacent first port 27 is defined in control member 26. A fourth port 36 is defined in control 26 adjacent second port 32. A fifth port 38 is defined in control member 26 adjacent port 27.

Port 27 includes a transverse inner surface 40. In surface 40 is mounted a conduit 42. Surface 40 defines an aperture 44. As stated in detail below, port 27, conduit 42, port 38 and aperture 44 operate to provide flow of air and cutting fluid; ports 32, 36 operate in connection with flow of coolant.

As depicted, system 10 is arranged for flow of cutting fluid. An air and cutting fluid conduct 46 comprising an inner tube (not shown) and an outer tube 47 is connected between port 34 and a source 48 of cutting fluid. An air conduit 50 is connected between port 38 and cutting fluid source 48.

Cutting fluid source 48 is of conventional type such as a device marketed under the trademark Unimist by co-assignee Unimist, Inc. Source 48 includes a cutting fluid reservoir 52 containing a quantity of cutting fluid 53 and is connected to a source (not shown) of compressed air by fitting 54 and conduit 55. Source 48 includes an air pump means 56 (shown schematically) for pumping cutting fluid and further includes a sensor-actuator 58 connected to conduit 50 and to the compressed air source by conduit 55.

Sensor-actuator 58 senses and is responsive to presence and absence of air flow through an air path comprising port 38, aperture 44, conduit 50, sensor-actuator 58 and conduit 55. While air is flowing, sensor-actuator 58 and pump 56 remain inactive. When the flow of air ceases, sensor-actuator 58 actuates and opens air pump means 56 to direct cutting fluid 53 (combined with compressed air) from reservoir 52 through conduit 46.

Stop arm 18 is depicted as disposed within port 27. This causes blockage of hole 44, thereby actuating pump means 56 in the above-described manner. Stop arm 18 includes an inner fluid flow conduit 60 connecting to control member 26 by an inlet port 62. Conduit 60 extends through stop arm 18 and housing 21, extending outwardly from the lower end thereof at a fitting 64 to which is secured a tube 66. The latter extends adjacent tap 24 in such a manner that fluid from tube 66 is directed upon tap 24.

In an alternate operating mode (not shown), stop arm 18 is inserted into port 32, whereby recirculating coolant fluid from machine 15 circulates through port 36, port 32 and conduit 60 to be directed upon tap 24.

In operation, the operator of the machine decides whether cutting fluid or coolant will be employed. If the latter is decided upon, then the operator will connect the stop arm 18 into port 32, thereby accessing the recirculating coolant in machine 15. If cutting fluid is to be employed, the operator inserts stop arm 18 into port 27, thereby causing flow of cutting fluid as described above.

In the foregoing manner, flexibility is provided in connection with tapping performed by automated equipment such as CNC machines.

The foregoing is exemplary and not limiting of the scope of the invention, which is defined by the appended claims interpreted in light of the specification and drawings.

What is claimed is:

1. A system for dispensing of fluid, including cutting fluid and coolant for a tapping attachment comprising:
   (1) sensor-actuator means responsive to presence and absence of air flow to control dispensing of fluid to a tapping attachment;
   (2) Control means connectable with said sensor-actuator means for air flow therebetween, said control means including means for controlling air flow between said control means and said sensor-actuator means and being connectable to a tapping attachment.

2. The invention as set forth in claim 1 further including means for connecting to a source of fluid and means for directing said fluid to said tapping attachment.

3. The invention as set forth in claim 1 wherein said control means includes means for connecting to a machine to which said tapping attachment is connectable to provide power to perform tapping.

4. The invention as set forth in claim 1 wherein said sensor-actuator means is responsive to absence of air flow to cause flow of cutting fluid.

5. The invention as set forth in claim 4 wherein said control means includes means for preventing air flow when connected to a tapping attachment.

6. A control system for controlling dispensing of fluid including cutting fluid and coolant to a tapping attachment comprising:
   (1) connecting means for connecting to a tapping attachment for directing fluid thereto;
   (2) control means for controlling fluid dispensing means to actuate said fluid dispensing means to supply fluid to said tapping attachment and to deactuate said fluid dispensing means to stop flow of fluid, said control means being responsive to the absence of air flow to actuate said fluid dispensing means.

7. The invention as set forth in claim 6 wherein said control means causes air flow to be absent when said connecting means is connected to a tapping attachment and said control means permits air flow when said connecting means is disconnected from said tapping attachment.

8. The invention as set forth in claim 7 wherein said control system further comprises at least one control member including said means for connecting to a tapping attachment and includes means connectable to a machining center on which said tapping attachment is mountable to perform tapping.

9. The invention as set forth in claim 8 wherein said at least one control member defines at least one port for receiving a conduit to said tapping attachment, and wherein said port includes means providing access for air flow for said control means.

10. The invention as set forth in claim 9 wherein said at least one port is connectable to a source of air flow and to sensor-actuator means, said sensor-actuator means being responsive to absence of air flow to actuate said fluid dispensing means to dispense fluid, said air flow being substantially prevented by connection of said tapping attachment conduit to said machining center through said port.

11. The invention as set forth in claim 10 wherein said at least one control member further includes a second port connectable to said tapping attachment and to a source in said machining center of coolant fluid.

12. The invention as set forth in claim 11 wherein said port is configured to receive a stop arm of a tapping attachment, said stop arm including a conduit to said tapping attachment.

13. The invention as set forth in claim 10 wherein said port is connectable to said fluid dispensing means to receive a flow of cutting fluid.

\* \* \* \* \*